Patented Aug. 2, 1938

2,125,849

UNITED STATES PATENT OFFICE 2,125,849

SHORTENING COMPOUND

Charles E. Morris, Chicago, Ill., assignor to Armour and Company, Chicago, Ill., a corporation of Illinois No Drawing. Application October 25, 1935, Serial No. 46,790

12 Claims. (Cl. 99—123)

This invention relates to substantially anhydrous shortening compounds and it comprises an improved shortening compound of the edible fatty material type containing a small amount of lecithin, and improved by the presence therein of a small amount of triethanolamine, or by treating the lecithin-containing shortening with small amounts of ammonia.

Recently efforts have been directed towards methods of preparing improved cakes and similar baked products. Ordinarily, it is difficult to make a cake having satisfactory appearance, volume, grain and texture when the quantity of sugar in the cake batter exceeds the quantity of flour. For some reason or other the batter tends to curdle and the baked cake "falls" with loss of volume and the development of poor eating qualities, poor texture, and other objectionable characteristics. A "sweet cake" is one in which the quantity of sugar exceeds the quantity of flour and such cakes would have high moisture content, good texture, appearance and volume, and greatly enhanced consumer appeal were it not for the fact that the addition of such large quantities of sugar to the batter results in curdling and the stated objectionable characteristics.

A characteristic average cake formula using ordinary hydrogenated oil shortening is as follows:

| | |
|---|---|
| Flour | 1 lb. 4 ozs. |
| Sugar | 1 lb. 2 ozs. |
| Eggs | 9 ozs. |
| Shortening | 8 ozs. |
| Milk | 11 ozs. |
| Salt | ¾ oz. |
| Baking powder | 1 oz. |

This formula will give an ordinary cake but it will not be of the "sweet" variety because the amount of sugar is less than the flour. Also the moisture, texture, and grain will not be as good as could be obtained if the quantity of sugar could be increased.

A typical "sweet cake" or "high ratio" formula is as follows:

| | |
|---|---|
| Flour | 1 lb. 4 ozs. |
| Sugar | 1 lb. 12 ozs. |
| Shortening | 11 ozs. |
| Egg whites | 15 ozs. |
| Milk | 1 lb. 3 ozs. |
| Salt | ¾ oz. |
| Baking powder | 1¼ ozs. |

But if an ordinary shortening is used, the batter is rough, and badly curdled, the baked cake "falls", or is "sad", and has poor appearance, inadequate volume, unsatisfactory texture and poor eating qualities. It is to be noted that the sugar is 140 percent of the flour. Anything over 100 percent would be designated as "high ratio" in the art.

The problems presented in making a cake of the high sugar to flour variety have been recently attacked by the development of shortening agents which will permit the incorporation of large quantities of sugar in the batter, and also more milk, without curdling developing. My present invention has for its object, the preparation of shortening materials especially suitable for uses in such cake batters but by no means limited thereto. The shortening agents of the present invention are "all-purpose" shortenings and can be used in all the usual batters, for frying, etc.

I have discovered that a modified lecithin-containing shortening material will enable me to achieve the stated object. Shortening agents of the substantially anhydrous, or so-called dry types, are old materials, and many patents have been granted for incorporating lecithin in these shortening oils and fats to give shortening compounds having improved properties.

When a lecithin-containing shortening is used in making up a cake batter in which the ratio of sugar to flour is greater than 1 (for example, the second formula given above) the batter is smooth, glossy and homogeneous, and cakes baked therefrom are superior and do not immediately develop objectionable characteristics. In other words, the addition of the lecithin, usually in amounts of from 1 to 5 percent, to the shortening improves the batter and prevents curdling, and gives a baked cake of fairly satisfactory terture. However, the cake when removed from the oven tends to shrink somewhat. This is undesirable since the volume of the cake is then insufficient to give a commercially salable article.

Of greater significance, an ordinary lecithin-containing shortening appears to "age". When first prepared, it will give a batter of reasonably satisfactory quality, but if the prepared shortening is not used until a month or so after preparation, it no longer gives as good a batter as freshly prepared shortening, and the finished cake is of poor quality. Apparently some obscure change occurs in the shortening during aging, but whatever it is, the fact remains that aged lecithin containing shortening does not give as good results as freshly made lecithin containing shortening. This is a serious objection to the use of lecithin-containing shortenings in this art because such shortenings are customarily made in bulk and held for long periods before use.

To summarize then, while a freshly made lecithin-containing shortening will give a good high ratio batter, the cake baked therefrom will tend to shrink when removed from the oven, and such a shortening, if allowed to age, undergoes deterioration to such an extent that the initial benefits of the lecithin are no longer obtained.

Although the addition of 8 to 20 percent of a vegetable oil such as palm or coconut oil to a hydrogenated vegetable oil shortening containing from 1 to 5 percent of lecithin will counteract the tendency for the cake to shrink when removed from the oven, such a modified lecithin-containing shortening exhibits the aging phenomena noted above.

I have now discovered ways of stabilizing a lecithin-containing shortening and I have been able to prepare such shortenings which so improve the finished sweet cake that no tendency to shrink after baking is noticed, and the desirable properties of the lecithin are maintained over long periods of time. In other words, I have been able to prepare a modified lecithin-containing shortening which can be prepared in bulk, shipped, and stored over long periods of time, and yet will be more effective than freshly made unmodified shortening.

I have discovered that the addition of a very small amount of triethanolamine to a shortening containing a small amount of lecithin will prevent the deterioration noted above. I have further discovered that the deterioration can be prevented if the lecithin-containing shortening is treated with a little gaseous ammonia. These two methods can also be combined as I shall presently describe.

One very advantageous shortening falling within the scope of the present invention consists of an ordinary hydrogenated edible fat or oil (such as hydrogenated cottonseed oil) to which has been added about 0.75 percent of lecithin and 0.10 percent of triethanolamine. In making this shortening I heat the hydrogenated oil to about 50° C. so that it is liquefied if it be normally solid, and then I add the lecithin and triethanolamine with agitation to dissolve and incorporate the added constituents. Then the prepared shortening is chilled and texturated in the well-known ways customarily used in the industry.

When I use this prepared shortening in the high ratio cake formula given above, the baked cakes have excellent grain, texture, appearance, volume, and eating qualities. These cakes do not shrink when withdrawn from the oven. The shortening exhibits no aging or deterioration, even on standing for long periods of time at temperatures as high as 90° F. This means that the shortening can be prepared in bulk and stored, and yet will give cakes of high quality regardless of when the shortening is used.

In another modification of my invention, I find that gaseous ammonia seems to give results similar to triethanolamine but not to quite as high degree. Thus I dissolve about 0.75 percent of lecithin in a hydrogenated cottonseed oil at 50° C. and then bubble in a small amount of ammonia gas after which the treated shortening is chilled and texturated. The actual amount of ammonia incorporated is very small, of the order of 0.1 percent and the finished product at no time has any perceptible taste or odor which can be attributed to the ammonia. This light ammonia treatment prevents aging or deterioration and also shrinking in the finished cakes.

I can combine both methods by dissolving about 0.75 per cent lecithin and 0.1 percent of triethanolamine in the oil and then treat the oil with very small amounts of ammonia as described above.

In the absence of the triethanolamine or ammonia the quantity of lecithin necessary in the shortening to give a material suitable for high ratio cake batters is generally around 5 percent. I do not usually need so much and lecithin in amounts of the order of 1–2 percent is sufficient. But proportions are to be guided more by economic considerations, and from about 0.5 to 2 percent is adequate for most purposes. Likewise the quantity of triethanolamine is not apparently critical, although for reasons of economy I prefer to use it in very small amounts, of the order of 0.1 percent.

Where I speak of lecithin, I mean ordinary commercial soy bean lecithin containing approximately 50–60 percent of lecithin. Such commercial lecithin products usually contain amounts of fatty acids and it is possible that the fatty acid therein combines with the triethanolamine to form a soap such as triethanolamine oleate. If the lecithin does not contain any free fatty acid I find it advantageous to add a small amount of oleic or stearic acid in such quantities that the total amount of fatty acid present is equal to about twice the amount of triethanolamine used. Frequently the basic shortening oil or fat may contain adequate quantities of free fatty acids for this purpose.

But ordinarily either the added lecithin or the edible oil will contain free fatty acids in quantities sufficient to form the triethanolamine soap which I suspect may possibly form. Since I am unable to definitely prove that soaps form I prefer to define my invention as comprising in part the addition of triethanolamine to the oil or fat but I do not intend that this shall exclude the formation in situ of triethanolamine soap as suggested above.

Any of the edible fats and oils, either liquid, plastic, or solid, customarily used in shortening compounds can of course be used in my invention. And lecithin can be used in conjunction with other substances imparting "high ratio" qualities to the shortening, so that it will work well in high ratio batters.

All of the products of the present invention are anhydrous, or substantially so, and they do not contain more than about 0.1 to 0.3 percent of moisture at the most. They are not to be confused with emulsions.

Having thus described my invention, what I claim is:

1. A substantially anhydrous edible shortening composed of an edible fatty material and containing small amounts of lecithin and triethanolamine, the triethanolamine acting as a stabilizing agent.

2. A substantially anhydrous edible shortening composed of an edible fatty material and containing a small amount, of the order of 0.5 to 2 percent of lecithin and a small amount, of the order of 0.1 to 0.5 per cent of triethanolamine, the triethanolamine acting as a stabilizing agent.

3. The shortening as in claim 1 wherein the edible fatty material includes a hydrogenated oil.

4. The shortening as in claim 2 wherein the edible fatty material includes a hydrogenated cottonseed oil.

5. A substantially anhydrous edible shortening composed of an edible fatty material, small amounts of lecithin and triethanolamine, and a small amount of ammonia, the triethanolamine and ammonia acting as a stabilizing agent.

6. A substantially anhydrous edible shortening composed of an edible fatty material, a small amount, of the order of 0.5 to 2 percent of lecithin and a small amount, of the order of 0.1 to 0.5 percent of triethanolamine, and a small amount of ammonia, the triethanolamine and ammonia acting as a stabilizing agent.

7. The shortening as in claim 5 wherein the edible fatty material includes a hydrogenated oil.

8. The shortening as in claim 6 wherein the edible fatty material includes a hydrogenated cottonseed oil.

9. A substantially anhydrous edible shortening composed of an edible fatty material and containing a small amount of the order of 0.5 to 2 percent of lecithin, and a small amount of ammonia, the ammonia acting as a stabilizing agent.

10. The shortening as in claim 9 wherein the edible fatty material includes a hydrogenated oil.

11. The shortening as in claim 9 wherein the edible fatty material includes a hydrogenated cottonseed oil.

12. A substantially anhydrous edible shortening composed of an edible fatty material, a small amount of lecithin and a small amount of a stabilizing agent chosen from the group consisting of ammonia and its triethanol substitution products.

CHARLES E. MORRIS.